US009577858B2

(12) United States Patent
Schaffner (10) Patent No.: US 9,577,858 B2
(45) Date of Patent: Feb. 21, 2017

(54) RF CHIRP RECEIVER SYNCHRONIZATION

(75) Inventor: Terry M. Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 120 days.

(21) Appl. No.: 13/209,744

(22) Filed: Aug. 15, 2011

(65) Prior Publication Data

US 2012/0307871 A1 Dec. 6, 2012

Related U.S. Application Data

(60) Provisional application No. 61/492,550, filed on Jun. 2, 2011.

(51) Int. Cl.
*H04B 1/00* (2006.01)
*H04L 27/10* (2006.01)
*H04L 27/00* (2006.01)

(52) U.S. Cl.
CPC ......... *H04L 27/103* (2013.01); *H04L 27/0014* (2013.01); *H04L 2027/0026* (2013.01); *H04L 2027/0046* (2013.01); *H04L 2027/0067* (2013.01)

(58) Field of Classification Search
CPC ...... H04B 1/69; H04B 2001/6912; H04J 1/05; H04L 27/103; H04L 27/2607; H04L 2027/0067
USPC ......................................... 375/130, 133, 139
See application file for complete search history.

(56) References Cited

U.S. PATENT DOCUMENTS

| | | | |
|---|---|---|---|
| 2001/0012984 A1* | 8/2001 | Adamiak et al. ............... | 702/58 |
| 2008/0298502 A1* | 12/2008 | Xu et al. ....................... | 375/299 |
| 2009/0252112 A1* | 10/2009 | Shimomura et al. ......... | 370/330 |
| 2011/0188559 A1* | 8/2011 | Van Nee ....................... | 375/226 |
| 2011/0261909 A1* | 10/2011 | Andgart et al. .............. | 375/341 |

* cited by examiner

*Primary Examiner* — Leila Malek
(74) *Attorney, Agent, or Firm* — Fogg and Powers LLC (57) ABSTRACT

A radio frequency communication system includes a radio frequency transmitter having a chirp generator operable to transmit a first chirp signal, and transmit a second chirp signal that is circular shifted relative to the first chirp signal. A receiver receives the first chirp signal and the second chirp signal, such that the proportion of phase offset between the first and second chirp signals is proportional to the frequency offset of the received signals. The first and second chirp signals are despread, and the phase difference between the first and second chirp signals is used to determine a frequency offset of the received first and second chirp signals that is proportional to the phase difference between the first and second chirp signals.

12 Claims, 6 Drawing Sheets

$$\Delta\theta = (2\pi/N)(T_k - T_i)F_{coarse} \quad \sim 601$$

$$F_{coarse} = \left(\frac{\Delta\theta N}{2\pi(T_k - T_i)}\right) \quad \sim 602$$

$$CoarseFrequency(Hz) = rnd\{F_{coarse}\}F_s \quad \sim 603$$

FIG. 6

RF CHIRP RECEIVER SYNCHRONIZATION

CLAIM OF PRIORITY

This patent application claims the benefit of priority, under 35 U.S.C. §119(e), to Terry Michael Schaffner, U.S. Provisional Patent Application Ser. No. 61/492,550, entitled "RF CHIRP RECEIVER SYNCHRONIZATION," filed on Jun. 2, 2011, which is hereby incorporated by reference herein in its entirety.

FIELD

The invention relates generally to wireless communication signals, and more specifically in one embodiment to RF chirp receiver synchronization.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Many of today's computers, cellular telephones, and other such devices rely on wireless communication to exchange information with other devices, such as to surf the Internet, send and receive email, and communicate audio and video. Many such devices also include GPS, useful in that it enables a person to determine where they are, overlay their location on a map, and get directions. GPS signals are often also used by other applications, such as a restaurant review application that shows reviews of restaurants near a user, or a shopping application that shows stores near a user that have a particular item for sale.

But, GPS signals are difficult to receive in some cities with tall buildings or other interference, and GPS is often left out of lower cost devices. Some devices therefore use cellular phone towers or other radio signals having known location to use as a reference, and can determine approximate position of a mobile radio device by estimating the distance from the mobile wireless device to multiple cellular towers. This can be performed such as by using chirp signals and measuring the time of flight between RF devices, but accuracy is dependent in part on synchronization between the two devices.

Chirp signaling may also be used in communication systems. In a chirp-spread system, when the offset of the carrier frequencies between the transmitter and the receiver becomes sufficiently large the frequency offset will appear as a time offset at the receiver. Chirp-modulated communication systems which have relatively large frequency spacing between samples (i.e., Fs/N) will not experience this time offset shift assuming the relative oscillator inaccuracy is smaller than the spacing. In other chirp-modulated communication systems, the time and frequency offset may not be corrected, and, in these cases, the symbol timing at the receiver may be misaligned with the received data. This produces a non-optimal partial correlation or intersymbol interference (ISI) that degrades the sensitivity of the receiver.

Additionally, if the receiver has no knowledge of the frequency offset it tracks the signal based upon the demodulated symbols in order to maintain synchronization. However, if the frequency offset is known at the receiver, it can use a more robust means of tracking the signal. If the symbol clock and the carrier frequency are derived from the same oscillator at the transmitter and receiver, the frequency offset is proportional to the time drift. Thus, the frequency offset information can be used to track the incoming signal. This method of tracking is much more robust in high interference or low signal to noise environments. A third reason for correcting the time and frequency offset is to ensure a common receive phase among chirp offsets when employing orthogonal chirp modulation to convey data.

For these and other reasons, it is desired to synchronize two devices using chirp signals for RF communication.

SUMMARY

Some example embodiments of the invention comprise a radio frequency communication system that includes a radio frequency transmitter having a chirp generator operable to transmit a first chirp signal, and transmit a second chirp signal that is circular shifted relative to the first chirp signal. A receiver receives the first chirp signal and the second chirp signal, such that the proportion of phase offset between the first and second chirp signals is proportional to the frequency offset of the received signals. The first and second chirp signals are despread, and the phase difference between the first and second chirp signals is used to determine a frequency offset of the received first and second chirp signals that is proportional to the phase difference between the first and second chirp signals.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

As noted above, typical chirp-modulated communication systems do not measure and attempt to remove the frequency offset of the received signal prior to the correlation with the expected chirp waveform. Without reducing the frequency offset, the time offset error induced by the frequency offset may significantly degrade the performance of the receiver. In addition, with a known frequency offset at the receiver a more robust time tracking algorithm can be employed. Ranging systems using propagation time of flight of chirp signals also use synchronization in frequency and timing to establish an accurate time of flight of the chirp signal.

Some embodiments of the invention seek to synchronize a spread spectrum chirp receiver to a transmitter by transmitting one or more circular-shifted chirps in addition to a non-shifted chirp signal. The frequency offset and symbol timing offset can be determined based on the phases of the despread chirp signals.

Figure 1:
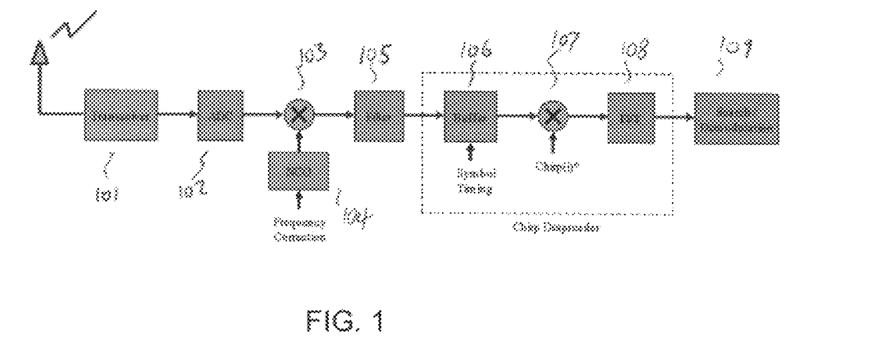
FIG. 1 shows a chirp-based receiver, consistent with an example embodiment of the invention.

A diagram of a chirp-based receiver is shown in FIG. 1, consistent with an example embodiment of the invention. A transceiver 101 downconverts the RF signal to a complex baseband (zero intermediate frequency) signal. A pair of analog to digital converters (ADCs) 102 translates the analog signals into digital signals. The digital circuitry in the receiver then estimates and removes the frequency offset of the received signal relative to the receiver's local oscillator. This is accomplished by multiplying the received digital baseband signal with a complex sinusoid with a frequency equal to the negative frequency offset of the received signal at 103. A Numeric Controlled Oscillator (NCO) 104 and complex multiplier provides this functionality.

The signal is then filtered with a digital low-pass filter at 105 in order to reject unwanted noise outside the pass-band. Chirp de-spreading is then accomplished by buffering a block of N samples at 106, multiplying the samples by the complex conjugate of the chirp sequence at 107, and performing a Fast Fourier Transform (FFT) on the resulting block at 108. The output of the FFT provides a phase and magnitude for each of the N possible time offsets of the received signal. This provides an efficient means of searching and demodulating the chirp signal. The FFT data then feeds the search and demodulation engine of the receiver at 109.

Figure 6:
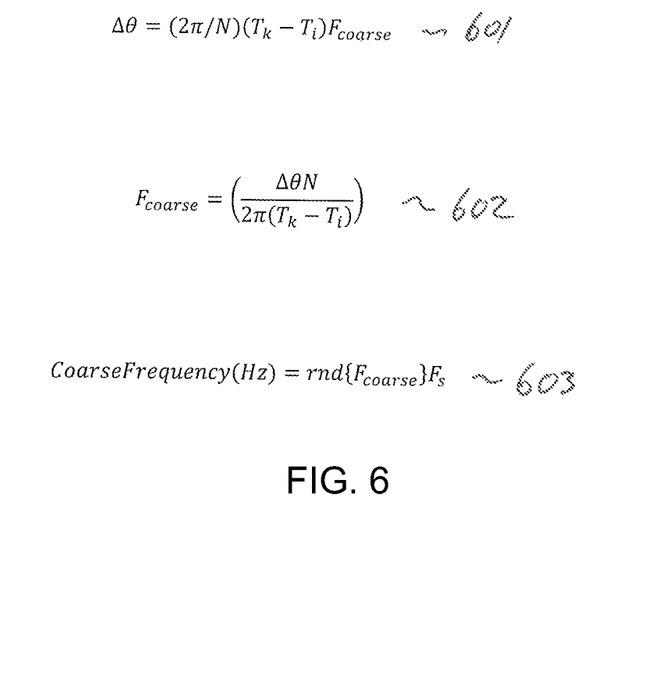
FIG. 6 shows calculation of frequency offset using observed phase difference between a chirp signal and a frequency shifted chirp signal, consistent with an example embodiment of the invention.

In a more detailed embodiment of the invention, a novel method of determining the frequency offset and timing offset of a received chirp signal are provided. This relates to determining the frequency correction and symbol timing values as shown in FIG. 6. A linear chirp signal consists of a tone which increases or decreases frequency linearly with each sample, as depicted in the example of FIG. 2.

Figure 2:
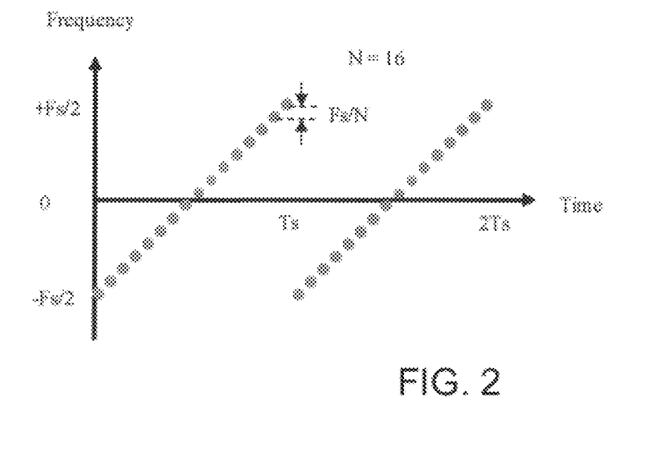
FIG. 2 shows a linear chirp signal, consistent with an example embodiment of the invention.

Referring to FIG. 2, a chirp with length N and bandwidth Fs changes frequency by Fs/N at each consecutive sample. Because the symbol rate at the output of the despreader is Fs/N, the signal will alias when the frequency offset exceeds +/− Fs/2N. As the frequency offset changes in multiples of Fs/N, the received signal appears to shift in time. When the frequency offset is a multiple, M, of Fs/N Hertz the frequency offset at the despreader output appears to be 0, but the time offset has shifted by M samples. This introduces a symbol timing error at the receiver. For high chirp bandwidths and relatively small frequency offsets this may not be a large concern since the symbol timing error will be small. For smaller bandwidths, or in the case where multiple parallel chirp channels are transmitted, the timing error may produce significant degradations. This is because the received block of samples is not aligned with received symbols resulting in inter-symbol interference (ISI).

Figure 3:
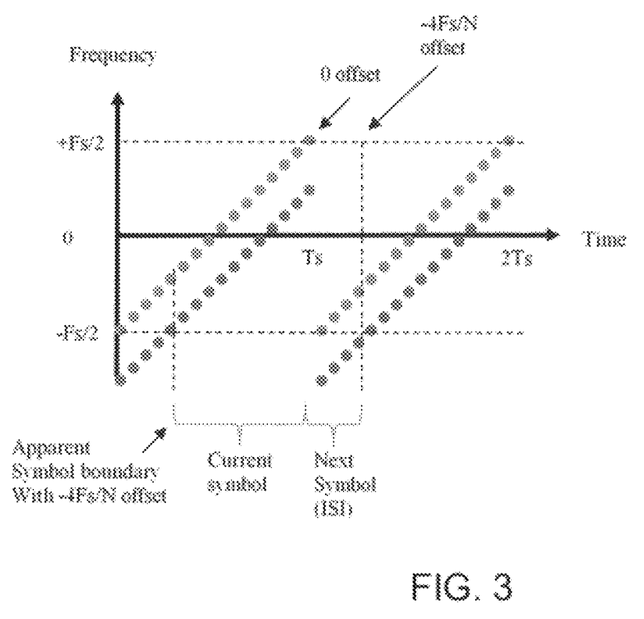
FIG. 3 shows a linear chirp signal with a frequency offset chirp signal, consistent with an example embodiment of the invention.

An example of inter-symbol interference as a result of frequency offset is shown in FIG. 3. Here, a frequency offset has shifted the frequency of the chirp signal by −4 Fs/N. This produces a timing delay error of 4 samples. A portion of the current symbol is buffered as well as the first 4 samples of the next symbol, resulting in ISI. Note, however, that the four samples of the next symbol are actually outside the passband (−Fs/2 to +Fs/2). Therefore, ISI only arises when the frequency response of the passband filter is insufficiently sharp to attenuate this portion of the signal. If an FFT-based filter or other type of sharp filter is used, the ISI may be avoided. Note, however, that there is then some amount of undesired signal loss due to the frequency offset resulting in a portion of the spectrum of the signal falling outside the passband.

The performance degradation due to ISI or signal loss in some examples may not be the main reason for wanting to correct the frequency offset. Other reasons include ability to accurately perform time tracking with knowledge of the frequency offset and carrier frequency, allowing coherent demodulation of multiple chirp offsets with a common reference phase, and time-of-flight estimation in order to compensate for relative oscillator inaccuracies.

Figure 4:
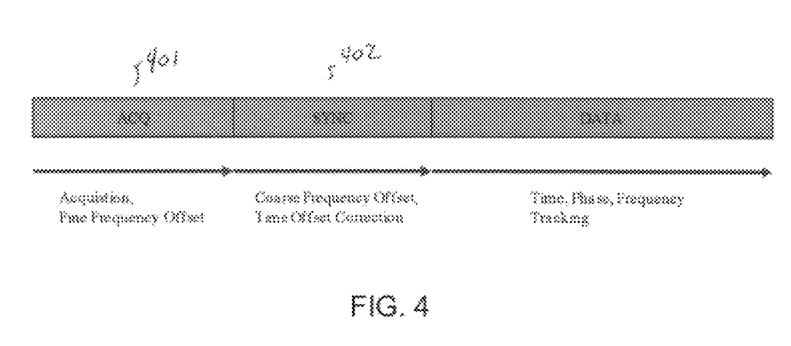
FIG. 4 shows a method of correcting frequency offset in a chirp receiver, consistent with an example embodiment of the invention.

To correct for frequency offset, a means of determining the coarse frequency offset is desired. The coarse frequency offset is in this example defined as the excess frequency offset in multiple integers of Fs/N. The coarse frequency offset is computed after the fine offset is estimated and removed from the received baseband signal. A timeline of this is shown in FIG. 4. The fine frequency offset may be estimated and mitigated by any known means such as through phase error measurements of the despread data.

In a more detailed example, the transmitter sends an acquisition signal (ACQ) at the beginning of a frame transmission as shown at 401. This consists of a number of un-modulated chirp symbols which facilitate acquisition of the signal at the receiver. Each symbol is a single chirp sequence having either an increasing or decreasing frequency characteristic. At this time the receiver may measure the channel impulse response as well as the fine frequency offset of the despread signal. The transmitter then sends a synchronization signal (SYNC) as shown at 402. This signal allows the receiver to determine the coarse frequency offset. The transmitter may optionally transmit only the SYNC signal. In this case the receiver acquires the transmission using the SYNC signal.

Figure 5:
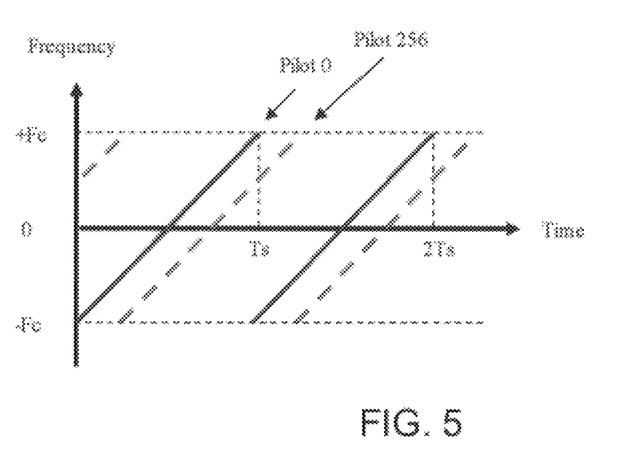
FIG. 5 shows a chirp signal and a circular shifted chirp signal, consistent with an example embodiment of the invention.

The synchronization sequence here consists of the chirp signal added with one or more circular shifts of the same chirp signal. An example of a circular shifted chirp signal is shown in FIG. 5, consistent with an example embodiment of the invention. Here, two un-modulated chirp signals, or pilot signals, are transmitted. Both signals consist of a length 1024 linear chirp. One has a circular shift of 0 samples (denoted Pilot 0), the other has a circular shift of 256 samples (denoted Pilot 256).

When the synchronization signal is recovered at the receiver, the despread data at offset 0 and the despread data at offset 256 may have different phases if there is a frequency offset in the signal. If the frequency offset of the signal is zero, the phases will be identical; if the frequency offset is non-zero, the phase difference will be proportional to the frequency offset. The equation relating the phase to the frequency offset is shown at 601 of FIG. 6.

Where Δθ is the phase difference in radians between despread offset $T_k$ and despread offset $T_i$, $T_k$ is the despread offset of pilot k, $T_i$ is the despread offset of pilot i, and Fcoarse is the frequency offset in integer units of Fs/N where Fs is the sample frequency (or chirp bandwidth) and N is the length of the chirp sequence. In the example of FIG. 5, N=1024, Tk=256, Ti=0 so the phase difference is equal to $\{(\pi/2)F_{coarse}\}$. So as the frequency offset increments in units of Fs/N Hertz, the phase difference will increment by $\pi/2$, or 90 degrees.

Now solving for Fcoarse, the resulting equation is shown at 602 of FIG. 6. The coarse frequency in Hertz is then CoarseFrequency(Hz)=rnd$\{F_{coarse}\}$Fs/N, as shown at 603 of FIG. 6.

Where rnd{ } is round to the nearest integer, Fs is the sample frequency, and N is the chirp length. The coarse frequency estimate should then be added to the fine frequency estimate to obtain the total frequency offset of the signal. The NCO shown at 104 in FIG. 1 is then fed with the negative value of the frequency offset in order to correct the receive signal. With the frequency offset removed, the despread offsets from the FFT then reflect the true timing offset. The symbol timing is corrected by advancing the timing by rnd{Fcoarse} samples.

The transmitter in some embodiments uses the SYNC portion of the frame to also convey the number of sub-channels used in the data portion of the frame. For example, transmitting a SYNC signal with chirps at offsets of 0 and 512 would indicate 2 sub-channels are used during the data portion of the frame using offsets of 0 and 512. Transmitting a SYNC signal with chirps at offsets of 0 and 256 would indicate 4 sub-channels during the data portion of the frame at offsets 0, 256, 512, and 768. In addition, transmitting more than one offset chirp sequence may be desirable in order to improve the reliability of the phase measurements in the presence of noise or interference. For example, the transmitter may use offsets of 0, 128, and 512 to indicate 8 sub-channels in the data portion of the frame. In this case the offset at 512 may be used by the receiver to improve the accuracy of the phase measurement.

A SYNC signal may be also be used in some embodiments which does not fully cover the expected worst case frequency offset. In this case the frequency offset may not be accurate; however, the frequency of the received signal is sufficiently corrected such that a common phase reference may be used for the data sub-channels. This may be desirable for transmissions using a small number of data sub-channels.

The examples presented here illustrate how a chirp signal and a circular shifted chirp signal can be used to determine frequency shift in the received signal, based on the observed phase change between chirps. The frequency shift information can be used to correct the frequency offset of the received signal, providing a reduction in inter-symbol interference (ISI), enabling tracking the time offset between the two devices, providing accurate ranging, and other such advantages over non-corrected systems.

Although specific embodiments have been illustrated and described herein, it will be appreciated by those of ordinary skill in the art that any arrangement which is calculated to achieve the same purpose may be substituted for the specific embodiments shown. The invention may be implemented in various modules and in hardware, software, and various combinations thereof, and any combination of the features described in the examples presented herein is explicitly contemplated as an additional example embodiment. This application is intended to cover any adaptations or variations of the example embodiments of the invention described herein. It is intended that this invention be limited only by the claims, and the full scope of equivalents thereof.

What is claimed is:

1. A method of estimating a frequency offset in a radio frequency signal, comprising:
   transmitting a first chirp signal from a transmitter;
   transmitting a second chirp signal that is circular shifted relative to the first chirp signal and added to the first chirp signal before transmission by the transmitter, such that the proportion of phase offset between the first and second chirp signals observed at a receiver is proportional to the frequency offset of the transmitted signals, wherein the frequency offset is a function of phase difference between the first and second chirp signals, number of samples per chirp, and a number of samples in the circular shift;
   wherein the frequency offset comprises a coarse offset that is an integer multiple of a sample frequency of the first and second chirp signals divided by the number of samples in a chirp; and
   determining a fine offset derived from a phase error measurement of a despread chirp, the fine offset comprising less than a multiple of the sample frequency divided by the number of samples per chirp; and adding the fine offset to the coarse offset.

2. The method of estimating a frequency offset in a radio frequency signal of claim 1, wherein the phase between the first and second chirp signals is received as identical if there is no frequency shift in the chirp signals when received.

3. The method of estimating a frequency offset in a radio frequency signal of claim 1, further comprising determining the circular shift applied to the second chirp signal to encode data.

4. A method of estimating a frequency offset in a radio frequency signal, comprising:
   receiving a first chirp signal;
   receiving a second chirp signal that is circular shifted relative to the first chirp signal, wherein the first chirp signal is added to the second chirp signal by a transmitter that transmitted the first chirp signal and the second chirp signal before transmission by the transmitter, such that the proportion of phase offset between the first and second chirp signals is proportional to the frequency offset of the received signals;
   despreading the first and second chirp signals;
   determining a phase difference between the first and second chirp signals;
   determining a frequency offset of the received first and second chirp signals that is proportional to the determined phase difference between the first and second chirp signals, wherein the frequency offset is a function of the phase difference, number of samples per chirp, and a number of samples in the circular shift;
   wherein the frequency offset comprises a coarse offset that is an integer multiple of a sample frequency of the first and second chirp signals divided by the number of samples in a chirp; and
   determining a fine offset derived from a phase error measurement of a despread chirp, the fine offset comprising less than a multiple of the sample frequency divided by the number of samples per chirp; and adding the fine offset to the coarse offset.

5. The method of estimating a frequency offset in a radio frequency signal of claim 4, further comprising removing the determined frequency offset from the received radio frequency signal.

6. The method of estimating a frequency offset in a radio frequency signal of claim 4, wherein the determined frequency offset is a function of phase difference times the number of samples per chirp, divided by the product of two π times a number of samples in the determined phase difference between the first and second chirps.

7. The method of estimating a frequency offset in a radio frequency signal of claim 4, further comprising using the determined frequency offset to determine at least one of a range between the receiver and a transmitter or a time delay between the receiver and the transmitter.

8. A radio frequency receiver, comprising:
- a chirp receiver configured to receive a first chirp signal and a second chirp signal that is circular shifted relative to the first chirp signal and added to the first chirp signal before transmission by a transmitter that transmitted the first chirp signal and the second chirp signal, such that the proportion of phase offset between the first and second chirp signals is proportional to the frequency offset of the received signals;
- a despreader configured to despread the first and second chirp signals; and
- a frequency offset tracker configured to determine a phase difference between the first and second chirp signals, and determine a frequency offset of the received first and second chirp signals that is proportional to the determined phase difference between the first and second chirp signals, wherein the determined frequency offset is a function of the phase difference between the first and second chirp signals, a number of samples per chirp, and a number of samples in the circular shift;
- wherein the frequency offset comprises a coarse offset that is an integer multiple of a sample frequency of the first and second chirp signals divided by the number of samples in a chirp; and
- wherein the frequency offset tracker determines a fine offset derived from a phase error measurement of a despread chirp, the fine offset comprising less than a multiple of the sample frequency divided by the number of samples per chirp; and add the fine offset to the coarse offset.

9. The radio frequency receiver of claim 8, the frequency offset tracker further configured to remove the determined frequency offset from a received radio frequency signal.

10. The radio frequency receiver of claim 8, wherein the determined frequency offset is a function of phase difference times the number of samples per chirp, divided by the product of two π times a number of samples in the determined phase difference between the first and second chirps.

11. The radio frequency receiver of claim 8, the frequency offset tracker further configured to use the determined frequency offset to determine at least one of a range between the receiver and a transmitter or a time delay between the receiver and the transmitter.

12. A radio frequency communication system, comprising:
- a radio frequency transmitter, comprising a chirp generator configured to transmit a first chirp signal, and transmit a second chirp signal that is circular shifted relative to the first chirp signal and added to the first chirp signal before transmission by the radio frequency transmitter;
- a radio frequency receiver configured to receive the first chirp signal and the second chirp signal, such that the proportion of phase offset between the first and second chirp signals is proportional to the frequency offset of the received signals;
- a despreader configured to despread the first and second chirp signals; and
- a frequency offset tracker configured to determine a phase difference between the first and second chirp signals, and determine a frequency offset of the received first and second chirp signals that is proportional to the determined phase difference between the first and second chirp signals, wherein the determined frequency offset is a function of the phase difference between the first and second chirp signals, a number of samples per chirp, and a number of samples in the circular shift;
- wherein the frequency offset comprises a coarse offset that is an integer multiple of a sample frequency of the first and second chirp signals divided by the number of samples in a chirp; and
- wherein the frequency offset tracker determines a fine offset derived from a phase error measurement of a despread chirp, the fine offset comprising less than a multiple of the sample frequency divided by the number of samples per chirp; and add the fine offset to the coarse offset.

* * * * *